United States Patent
Sakata et al.

(10) Patent No.: US 8,451,216 B2
(45) Date of Patent: May 28, 2013

(54) USER INTERFACE DEVICE, USER INTERFACE METHOD, AND RECORDING MEDIUM

(75) Inventors: Kotaro Sakata, Hyogo (JP); Shigenori Maeda, Kyoto (JP); Tomonari Takahashi, Osaka (JP); Hiroyasu Imoto, Osaka (JP)

(73) Assignee: Panasonic Corporation, Osaka (JP)

( * ) Notice: Subject to any disclaimer, the term of this patent is extended or adjusted under 35 U.S.C. 154(b) by 499 days.

(21) Appl. No.: 12/744,373

(22) PCT Filed: Sep. 28, 2009

(86) PCT No.: PCT/JP2009/004911
§ 371 (c)(1),
(2), (4) Date: May 24, 2010

(87) PCT Pub. No.: WO2010/035491
PCT Pub. Date: Apr. 1, 2010

(65) Prior Publication Data
US 2010/0259473 A1    Oct. 14, 2010

(30) Foreign Application Priority Data

Sep. 29, 2008  (JP) ................................. 2008-251044

(51) Int. Cl.
*G09G 5/00*  (2006.01)
(52) U.S. Cl.
USPC ............ 345/156; 345/175; 345/619; 715/700
(58) Field of Classification Search
USPC .................. 345/156–158, 173–184; 715/700, 715/863; 707/999.103, 999.104
See application file for complete search history.

(56) References Cited

U.S. PATENT DOCUMENTS

| | | | |
|---|---|---|---|
| 5,392,389 A | | 2/1995 | Fleming |
| 7,397,464 B1* | | 7/2008 | Robbins et al. ............... 345/173 |
| 7,519,223 B2* | | 4/2009 | Dehlin et al. ................. 382/203 |
| 2005/0183023 A1 | | 8/2005 | Maruyama et al. |
| 2008/0117167 A1* | | 5/2008 | Aonuma et al. .............. 345/157 |
| 2009/0106667 A1* | | 4/2009 | Lyle et al. ...................... 715/750 |

FOREIGN PATENT DOCUMENTS

| | | |
|---|---|---|
| CN | 1070273 | 3/1993 |
| JP | 2000-222133 | 8/2000 |
| JP | 2002-157079 | 5/2002 |
| JP | 2003-263145 | 9/2003 |
| JP | 2005-227487 | 8/2005 |
| JP | 2005-346353 | 12/2005 |
| JP | 2006-11914 | 1/2006 |
| WO | 2008/019896 | 2/2008 |

* cited by examiner

OTHER PUBLICATIONS

International Search Report issued Nov. 2, 2009 in International (PCT) Application No. PCT/JP2009/004911.

*Primary Examiner* — Kimnhung Nguyen
(74) *Attorney, Agent, or Firm* — Wenderoth, Lind & Ponack, L.L.P.

(57) ABSTRACT

A user interface device (1) includes: a detection unit (3) which detects a position of a user; a display unit (2) which displays a work space; and a control unit (4) which controls display of an independent object which belongs to no user. The control unit (4) moves the independent object in a mode which varies between when the independent object is in a face-to-face space of the display unit (2) which is face to face with the position of the user and when the independent object is outside the face-to-face space. The control unit (4) also stops the moving independent object in a workspace assigned to the user when the user obtains the independent object.

23 Claims, 12 Drawing Sheets

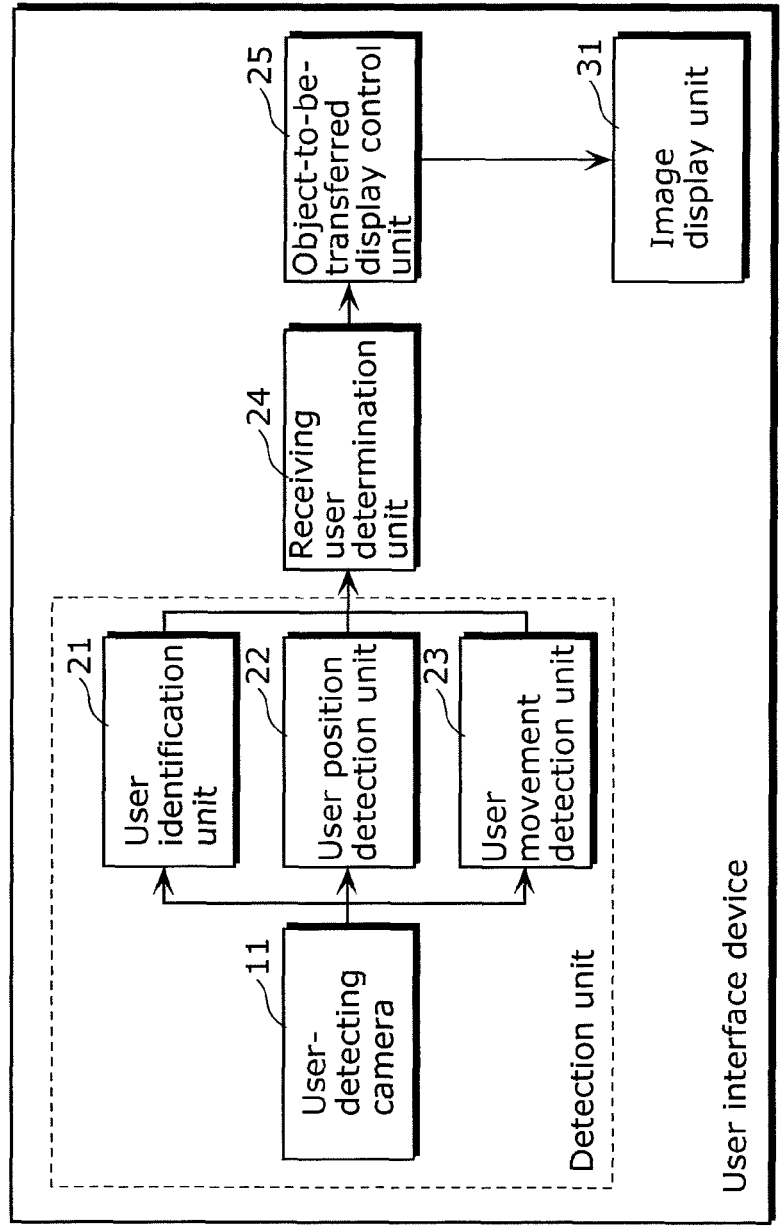

Fig. 4A

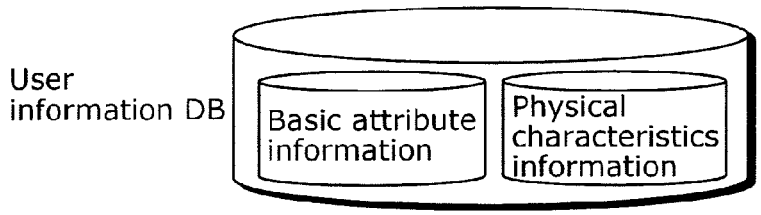

User information DB — Basic attribute information, Physical characteristics information

Fig. 4B

Basic attribute information

| ID | Name | Gender | Age | Relationship | ... |
|---|---|---|---|---|---|
| MA001 | Matsushita Taro | Male | 34 years old | Father | ... |
| MA002 | Matsushita Hanako | Female | 32 years old | Mother | ... |
| MA003 | Matsushita Daisuke | Male | 5 years old | Child | ... |
| ... | ... | ... | ... | ... | ... |
| MA015 | Yamamoto Jiro | Male | 33 years old | Friend of father | ... |
| ... | ... | ... | ... | ... | ... |

Fig. 4C

Physical characteristics information

| ID | Body height (eye height) in standing position | Body height (eye height) in sitting position | Dominant hand | Dominant eye | Eye sight Left/Right | Audibility | ... |
|---|---|---|---|---|---|---|---|
| MA001 | 1.76(1.55) | 1.26(1.06) | Left-handed | Left eye | 0.8/0.7 | Good | ... |
| MA002 | 1.65(1.43) | 1.16(1.23) | Right-handed | Right eye | 0.9/0.9 | Good | ... |
| MA003 | 1.01(0.84) | 0.67(0.47) | Right-handed | Right eye | 1.2/1.2 | Good | ... |
| ... | ... | ... | ... | ... | ... | ... | ... |
| MA015 | 1.82(1.62) | 1.29(1.43) | Right-handed | Left eye | 0.3/0.3 | Weak (right ear) | ... |
| ... | ... | ... | ... | ... | ... | ... | ... |

USER INTERFACE DEVICE, USER INTERFACE METHOD, AND RECORDING MEDIUM

TECHNICAL FIELD

The present invention relates to a user interface device for a large screen display operated by multiple people.

BACKGROUND ART

Along with an increase in screen size of and thinning of displays, not only have TVs been used to merely view broadcast contents, but also there has been an increasing possibility for new usage of the TVs such as simultaneous use of information items and browsing a large amount of information.

It is necessary to design more complex functions for simple use, in order to allow not only conventional programs and movies to be viewed but also the above new usage to be realized. For this purpose, it is necessary to realize an autonomous operation method which reduces an amount of explicit operation and operational load of a user by understanding a situation or intention of the user and anticipating an operation of the user based on a new operation method which allows an intuitive operation and user sensing information. In addition, it is desirable to employ an input method and an operation system assuming operations by multiple people, so as to be compatible with usage for not only passive viewing but also other purposes, while taking advantage of features of a TV set up in a common space of a family such as a living room.

Under these circumstances, as the new operation method, input devices have been developed which make it possible to input information desired by a user making a simple hand gesture or a gesture, without an apparatus such as a remote control being held by the user and without equipping a special apparatus. For example, an apparatus is known which issues a command for stop, slow movement or fast movement depending on a range of a hand movement of a user (see Patent Literature 1). In addition, there is an apparatus which displays, in the case where a touch panel of the apparatus detects that a hand of a user touches or approaches a ball moving within a screen, an image previously associated with the ball, so as to attract an interest of the user to the image displayed on the screen (see Patent Literature 2).

CITATION LIST

Patent Literature

[PTL 1]
Japanese Unexamined Patent Application Publication No. 2002-157079
[PTL 2]
Japanese Unexamined Patent Application Publication No. 2003-263145

SUMMARY OF INVENTION

Technical Problem

Along with the popularization of digital AV apparatuses represented by digital still cameras, an era has arrived when individuals readily record AV contents and hold a large amount of the AV contents. Furthermore, in view of features of a TV installed in a family common space such as a living room, a method is desired in which users can readily transfer a large amount of contents to each other within a screen.

However, an increase in display size tends to entail an increase in distance between a starting point and an ending point of movement of a content when transferring the content. The longer the distance between the starting point and the ending point of the movement of the content when transferring the content is, the larger a load when a content-passing user designates the ending point by making a gesture becomes.

Thus, a method is desired in which the content-passing user does not need to designate an exact location of the ending point and a content-receiving user can designate it. However, conventional techniques do not assume a situation of sharing content transfer, and have a problem that the content-receiving user cannot successfully receive the content when the content-passing user does not designate a movement direction of the content in a sufficiently adequate manner.

The present invention has been devised to solve the above conventional problems, and an object of the present invention is to provide a user interface device which controls movement of a content so that a user can readily obtain the content when the user attempts to obtain the content displayed on a screen.

Solution to Problem

A user interface device according to an aspect of the present invention allows a user to operate an object displayed in a work space assigned to the user. Specifically, the user interface device includes a detection unit which detects a position of the user; a display unit which displays the work space; and a control unit which controls display of an independent object which belongs to no user. The control unit moves the independent object in a mode which varies between when the independent object is in a face-to-face space of the display unit which is face to face with the position of the user and when the independent object is outside the face-to-face space. The control unit also stops the moving independent object in a workspace assigned to the user when the user obtains the independent object. With the above configuration, the user can judge whether or not to obtain the independent object after closely watching the independent object moving to in front of the user.

For example, the control unit may cause a moving speed of the independent object moving in the face-to-face space to be slower than a moving speed of the independent object moving outside the face-to-face space. Alternatively, the control unit may cause a display size of the independent object moving in the face-to-face space to be larger than a display size of the independent object moving outside the face-to-face space. With this configuration, the user can judge whether or not it is necessary to obtain the independent object after closely watching the independent object.

Further, the detection unit detects a gesture of the user. The control unit may stop the independent object in the work space assigned to the user when the detection unit detects an obtainment gesture indicating that the independent object is to be obtained.

For instance, the obtainment gesture may be a gesture of turning a palm to a screen for a predetermined time period. Alternatively, the obtainment gesture may be a gesture of moving a fingertip of a thumb and fingertips of other fingers in a pinching manner. Still alternatively, the obtainment gesture may be a gesture in which an open hand facing the display unit is clenched while a palm is being turned toward oneself.

When the detection unit detects, with respect to an object possessed by an other user different from the user, a releasing gesture of the other user indicating that the object is to be released, the control unit may control display of the object as the independent object. With this, the user does not need to move the object to a work space assigned to a receiving user, and thus can simplify a transfer operation.

Moreover, the control unit may approximate a display angle of the independent object moving in the face-to-face space to a display angle at a time when the other user makes the releasing gesture. The independent object returns to its initial state even when the independent object moves while turning, and thus it becomes easy for the user to watch the independent object.

Furthermore, the display unit is divided into work spaces each assigned to a corresponding one of users. Further, the user interface device further includes a determination unit which determines, among the users, a recipient-candidate user which is a candidate to receive the independent object. The control unit moves the independent object in the mode which varies between when the independent object is in a face-to-face space of the display unit which is face to face with a position of the recipient-candidate user detected by the detection unit and when the independent object is outside the face-to-face space. In addition, the control unit may stop the independent object in a work space assigned to the recipient-candidate user when the recipient-candidate user obtains the independent object.

With the above configuration, an independent object is not slowed down or the like in front of a user who is least likely to obtain the independent object, and thus the transfer of object becomes more efficient as a whole. In addition, there is a case where a user having no intention of obtainment finds it uncomfortable to see the independent object moving across a work space, but the above configuration makes it possible to suppress the discomfort.

Further, the detection unit detects a gesture of the user. The control unit may increase a moving speed of the independent object when the detection unit detects an obtainment refusing gesture of the recipient-candidate user indicating that the independent object is not to be obtained, with the independent object being in the face-to-face space of the recipient-candidate user. This also makes it possible to increase the efficiency of the transfer of object, and at the same time to suppress the discomfort of the user having no intention of obtainment.

For example, the obtainment refusing gesture may be a gesture of moving a hand from side to side. Alternatively, the obtainment refusing gesture may be a state where the obtainment gesture has been made.

Further, the control unit may control the display of the independent object based on a physical characteristic of the user. This enables more precise display control. For example, the following aspect can be considered.

For instance, the physical characteristic is an age of the user. The control unit may cause a moving speed of the independent object moving in the face-to-face space to be slower as the age of the user is lower. Alternatively, the physical characteristic is a dominant arm of the user. The control unit may change a moving speed of the independent object moving in the face-to-face space according to a combination of the dominant arm and a moving direction of the independent object on the display unit. Still alternatively, the physical characteristic is a body height of the user. The control unit may cause a moving speed of the independent object moving in the face-to-face space to be slower as the body height of the user is lower. Further, the physical characteristic is a body height of the user. The control unit may cause a display height of the independent object moving in the face-to-face space to be lower as the body height of the user is lower.

Moreover, the control unit may control the display of the independent object according to metadata attached to the independent object and attribute information of the user. For instance, the control unit may obtain the attribute information by communicating with a mobile terminal carried by the user.

As a typical example, the object may be a picture. The object is not limited to the picture, and may include various files (or folders) that can be processed by general computers such as video data, music data, and document data.

Furthermore, when the independent object reaches one end of the display unit, the control unit may move the independent object toward the other end of the display unit. Accordingly, it is possible to give an occasion for re-obtainment a user who has failed to obtain the independent object once at least (or has not dared to obtain the independent object).

Moreover, when the independent object reaches a position away from one end of the display unit by a predetermined distance, the control unit may stop the independent object. Further, when a predetermined time period elapses with the independent object stopped, the control unit may hide the independent object. Consequently, it is possible to delete, from the display unit, an object for which no user shows intention of obtainment.

A user interface method according to another aspect of the present invention is a method of allowing a user to operate an object displayed in a work space assigned to the user, using a display unit which displays the work space, and specifically includes: detecting a position of the user; and controlling display of an independent object which belongs to no user. In the controlling, the independent object is moved in a mode which varies between when the independent object is in a face-to-face space of the display unit which is face to face with the position of the user detected in the detecting and when the independent object is outside the face-to-face space. In addition, the independent object is stopped in the work space assigned to the user when the user obtains the independent object.

A computer-readable recording medium according to still another aspect of the present invention on which a program causing a computer to execute the above user interface method is recorded. It is to be noted that the present invention can be realized not only as the user interface device but also as the program causing the computer to execute functions of the user interface device. Needless to say, such a program can be distributed via recording media such as CD-ROMs and transmission media such as the Internet.

Advantageous Effects of Invention

The user interface device of the present invention controls movement of a content according to a position of a user when the user attempts to obtain the content displayed on a screen, and thus the user can readily receive the content.

BRIEF DESCRIPTION OF DRAWINGS

FIG. 1A is a diagram showing an appearance of a user interface device according to one embodiment of the present invention and an example of an interface between the user interface device and related apparatuses.

FIG. 1B is a functional block diagram showing a configuration of the user interface device according the one embodiment of the present invention.

FIG. 2A is a diagram showing an example of installation of the user interface device according to the one embodiment of the present invention.

[FIG. 2A]

FIG. 2A is a diagram showing another example of installation of the user interface device according to the one embodiment of the present invention.

FIG. 2C is a diagram showing still another example of installation of the user interface device according to the one embodiment of the present invention.

[FIG. 3]

FIG. 3 is a functional block diagram showing a configuration of a user interface device according to a preferred embodiment of the present invention.

[FIG. 4A]

FIG. 4A is a diagram showing a user information data base according to the one embodiment of the present invention.

[FIG. 4B]

FIG. 4B is a diagram showing an example of basic attribute information included in the user information data base.

[FIG. 4C]

FIG. 4C is a diagram showing an example of physical characteristics information included in the user information data base.

FIG. 5A is a diagram showing an overview of a method of detecting a user position according to the one embodiment of the present invention.

FIG. 5B is a diagram showing a principle of stereoscopy that is an example of the method of detecting the user position.

FIG. 6A is a diagram showing an overview of a method of detecting a free hand gesture according to the one embodiment of the present invention.

FIG. 6B is a diagram showing a procedure of processing of detecting a free hand gesture according to the one embodiment of the present invention.

FIG. 7A is a diagram showing an example of a preferred use case of the user interface device according to the one embodiment of the present invention.

FIG. 7B is a diagram showing an example of a preferred use case of the user interface device according to the one embodiment of the present invention.

FIG. 8A is a diagram showing an example of a preferred use case of the user interface device according to the one embodiment of the present invention.

FIG. 8B is a diagram showing an example of a preferred use case of the user interface device according to the one embodiment of the present invention.

FIG. 9 is a diagram showing an operation example of the user interface device according to the one embodiment of the present invention (upper row), a trajectory of an object (middle row), and a moving speed of the object (bottom row).

FIG. 10 is a flowchart showing an overview of processing performed by the user interface device according to the one embodiment of the present invention.

FIG. 11 is a flowchart showing an overview of processing performed by the user interface device according to the one embodiment of the present invention.

DESCRIPTION OF EMBODIMENTS

The following describes an embodiment of the present invention with reference to the drawings.

1. Summary

A user interface device of the present invention is, for example, a device which controls an application which divides an image display unit into work spaces and is executed by users in the work spaces each assigned to one of the users.

2. Configuration

Figure 1A:
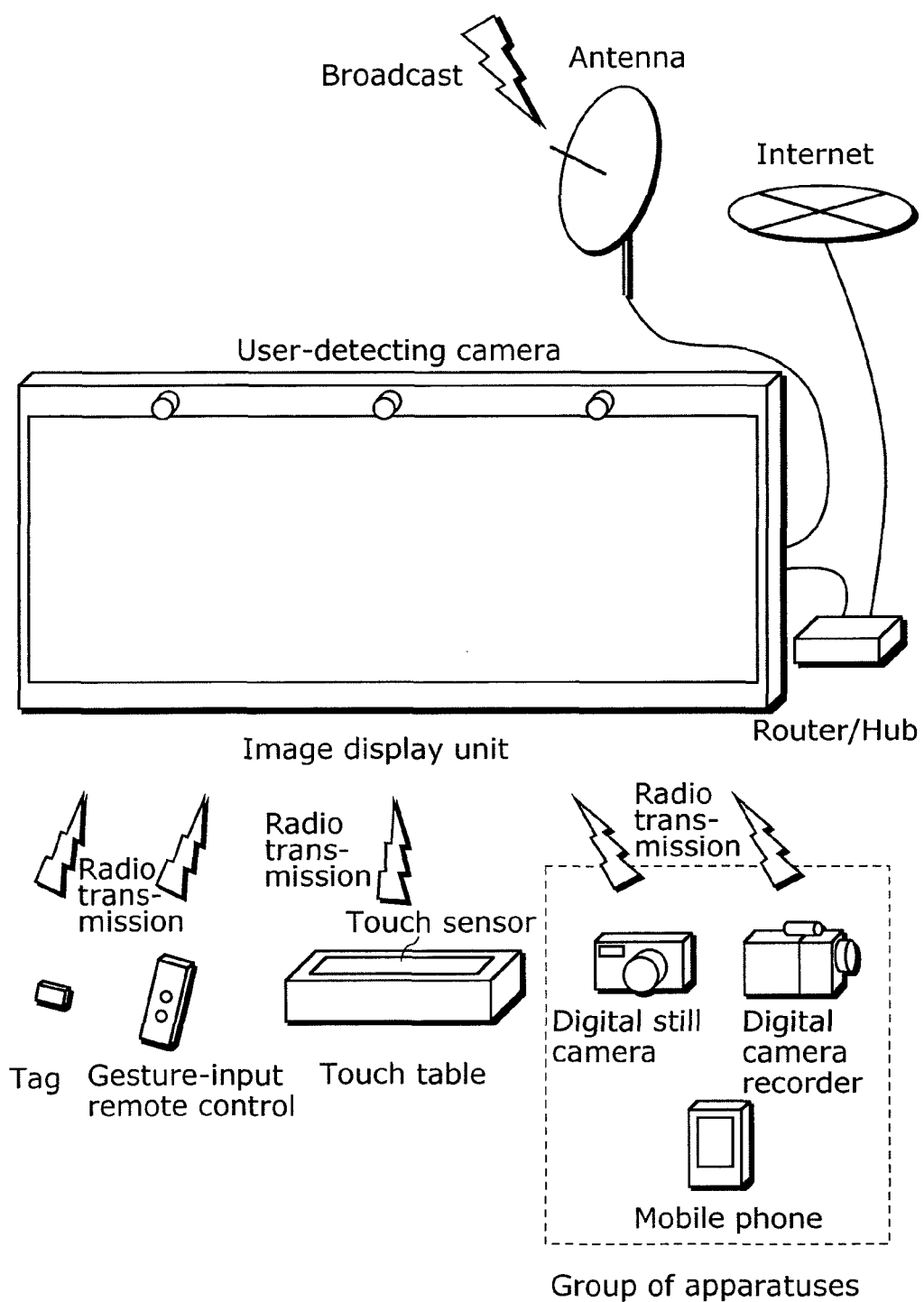
[FIG. 1A]

FIG. 1A is a diagram showing an appearance of the user interface device of the present invention and an example of an interface between the user interface device and related apparatuses. The user interface device includes, for instance, one or more user-detecting cameras. Display on the image display unit is controlled according to a position and a movement of a user detected based on an analysis of image information obtained by the one or more user-detecting cameras.

The display on the image display unit may be controlled based on a movement of the user's hand holding a gesture-input remote control or a remote control operation of the user such as holding down a button provided on the remote control.

Moreover, the user interface device may receive an input from a touch table including an electrostatic touchpad. Accordingly, the user can further selectively use various input methods to suit situations of the user or types of applications.

Furthermore, the user interface device obtains, from a tag (typically an IC tag) attached to an apparatus owned by the user, information about a name, a gender, an age, interests, preferences and the like of the user that is recorded in the tag, and thus can use the information to control an application.

Furthermore, the user interface device may be network-connected to other household electrical appliances such as a digital still camera and a digital camera recorder through radio transmission or via a router/hub.

The user interface device makes it possible to show on a screen digital information and an operation menu received from the appliances, and at the same time transmit to the appliances operation information of the user with respect to the menu shown on the screen.

It is to be noted that users can use the above user interface device to perform a group work such as creation and execution of a slide show using pictures.

Figure 1B:
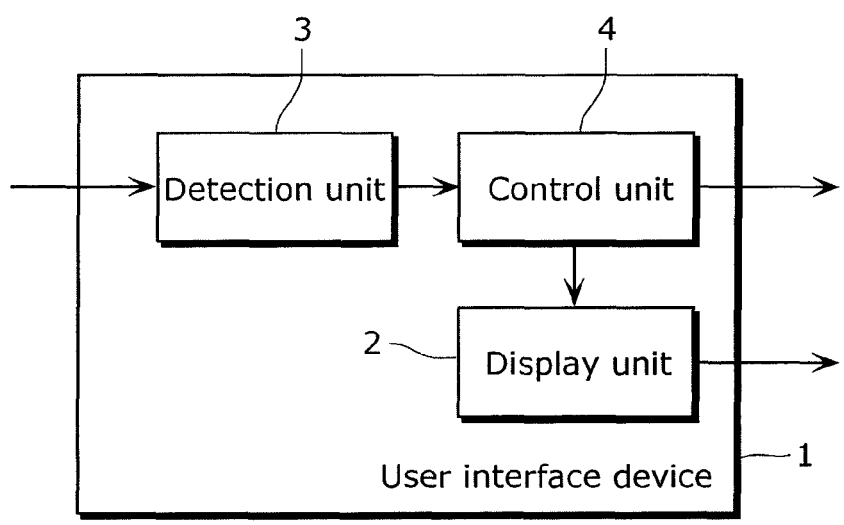
[FIG. 1B]

The following describes in detail a configuration of a user interface device 1 according to one embodiment of the present invention with reference to FIG. 1B. FIG. 1B is a block diagram of the user interface device 1.

The user interface device 1 is a device which assigns a work space to each of users and allows each user to operate an object in the work space. The work space is displayed on a display unit 2. The term "object" may include, for example, various files (or folders) that can be processed by general computers such as picture data, video data, music data, and document data. Further, the phrase "to operate an object" indicates, for instance, creating, browsing, editing, and deleting the above data.

A typical use case of the user interface device 1 is that the users cause plural picture data to be displayed in the work spaces each of which is assigned to a corresponding one of the users, and, for instance, browse and organize the plural picture data. In addition, it is possible to mutually transfer the object between the users. For example, a first user releases an object of the first user from a work space assigned to the first user. Then, a second user obtains the released object, and brings it into a work space assigned to the second user. The following describes in detail the present invention using such a situation as an example.

The display unit 2 is, for instance, a large-size display panel. Every available display panel such as a liquid crystal display, a plasma display, and an organic EL display can be used as the display panel. A work space and an object are displayed on the display unit 2. It is to be noted that the display unit 2 may be a large-size display which displays work spaces or a combination of displays which displays one work space.

A detection unit 3 detects a position of a user in front of the display unit 2. Further, the detection unit 3 may identify the user in front of the display unit 2, and detect a gesture of each of users and an amount of speech of each user. The detection unit 3 includes, for instance, an imaging unit such as a user-detecting camera and an analysis unit which analyzes an image captured by the imaging unit and detects a position of a user or the like.

A control unit 4 controls display on the display unit 2 and mainly display of an object. For example, the control unit 4 moves an object which belongs to no user (hereinafter referred to as "independent object"). For instance, a user selects an object displayed in a work space of the user and makes a gesture (hereinafter referred to as "releasing gesture") indicating that the object is to be released, and thus an independent object is generated. Alternatively, the user interface device 1 may automatically generate the independent object.

The control unit 4 moves the independent object in a mode which varies between when the independent object is in a space (hereinafter referred to as "face-to-face space") which is on the display unit 2 and in front of a user and when the independent object is outside the face-to-face space. For example, a moving speed of an independent object moving in a face-to-face space may be caused to be slower than that of an independent object moving outside the face-to-face space. Alternatively, a display size of the independent object moving in the face-to-face space may be caused to be larger than that of the independent object moving outside the face-to-face space. Further, a display angle of the independent object moving in the face-to-face space may be approximated to a display angle at a time when the user makes a releasing gesture.

In addition, when a user obtains a moving independent object, the control unit 4 stops the moving independent object in a work space assigned to the user. Subsequently, the user who has obtained the independent object can operate the object freely.

It is to be noted that the user can obtain the independent object by making, for instance, a gesture (hereinafter referred to as "obtainment gesture") indicating that the independent object is to be obtained, in front of the display unit 2. A specific example of the "obtainment gesture" is not limited, but may be, for example, a gesture of turning a palm to a screen for a predetermined time period. Alternatively, the obtainment gesture may be a gesture of moving a fingertip of a thumb and fingertips of other fingers in a pinching manner. Further, the obtainment gesture may be a gesture in which an open hand facing the display unit is clenched while a palm is being turned toward oneself.

On the other hand, when the user makes a gesture (hereinafter referred to as "obtainment refusing gesture") indicating that the independent object is not to be obtained, the control unit 4 may move the independent object in the same mode as in the case where the independent object is outside the face-to-face space of the user, even in the case where the independent object is in the face-to-face space. It is to be noted that a specific example of the "obtainment refusing gesture" is not limited, but may be, for instance, a gesture of moving a hand from side to side. Alternatively, the control unit 4 may determine that the user does not intend to obtain the independent object when not making an obtainment gesture for a predetermined time period.

In addition, the control unit 4 may control the display of the independent object based on a physical characteristic of the user. For example, the lower the user's age is, the slower the moving speed of the independent object may be. Alternatively, the moving speed may be changed according to a combination of a moving direction of the object and the user's dominant arm. Still alternatively, the lower the user's body height is, the slower the moving speed of the independent object may be. What is more, the lower the user's body height is, the lower the height of the display of the independent object may be.

Further, the control unit 4 may control the display of the independent object in consideration of the independent object's attribute and the user's attribute. For instance, when the object is a content for children, the moving speed may be slowest in a face-to-face space of a child. It is to be noted that the independent object's attribute can be obtained from metadata attached to the object. In addition, the user's attribute may be obtained by communicating with a mobile terminal carried by the user or attribute information of the user may be held in a database beforehand.

It is to be noted that in the case where the independent object reaches one end of the display unit 2 without any user showing intention to obtain the independent object, the control unit 4 may move the independent object toward the other end. Alternatively, in the case where the independent object reaches the one end of the display unit 2, the independent object may be stopped, and in the case where a predetermined time period elapses with the independent object being in a stopped state, the independent object may be hidden.

Figure 2A:
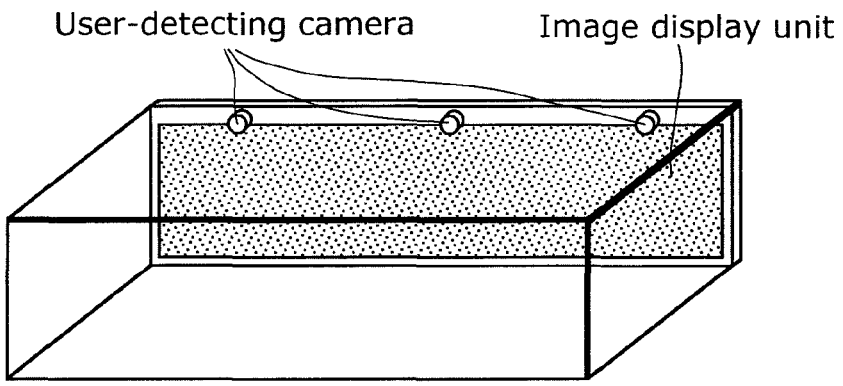
[FIG. 2A]
Figure 2B:
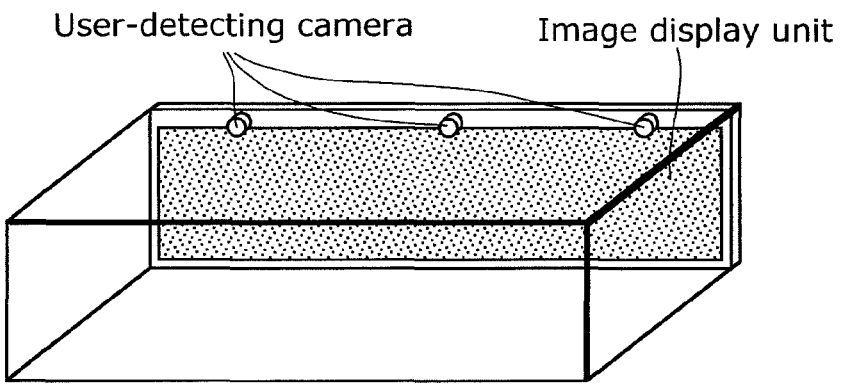
[FIG. 2C]
Figure 2C:
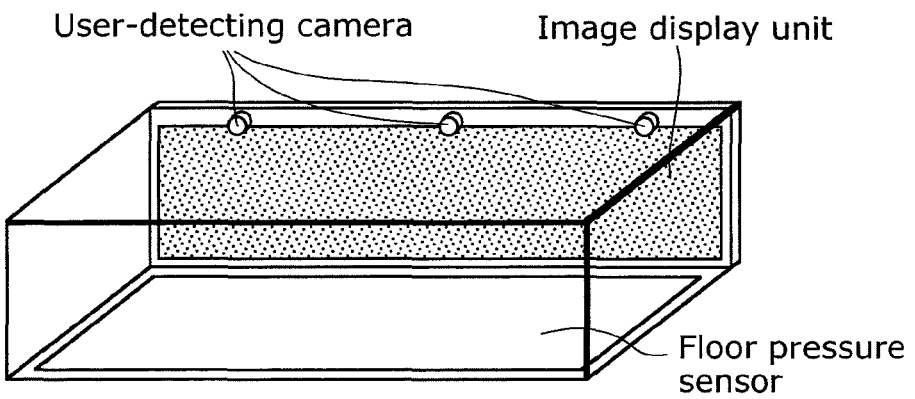

FIGS. 2A to 2C each are a diagram showing an example of installation of the user interface device of the present invention. User-detecting cameras are installed on a frame of the image display unit as shown in FIG. 2A. The installation is not limited to this, and the user-detecting cameras may be installed on a wall or a ceiling in a space where the image display unit is installed as shown in FIG. 2B. Further, a user-detecting camera installed around the image display unit and a user-detecting camera installed on the wall or the ceiling may be used in combination. As shown in FIG. 2C, installing a floor pressure sensor on a floor makes it possible to highly accurately detect a position of a user based on an output of the floor pressure sensor, without analyzing an image captured by a user-detecting camera.

FIG. 3 is a diagram showing a configuration example of a user interface device 10 according to a preferred embodiment of the present invention.

The following describes functions of each of blocks in FIG. 3.

The user interface device 10 includes a user-detecting camera 11, a user identification unit 21, a user position detection unit 22, a user movement detection unit 23, a receiving user determination unit 24, an object-to-be-transferred display control unit 25, and an image display unit 31.

It is to be noted that the user-detecting camera 11, the user identification unit 21, the user position detection unit 22, and the user movement detection unit 23 constitute the detection unit 3 shown in FIG. 1B in the present embodiment. In addition, the object-to-be-transferred display control unit 25 and the image display unit 31 correspond to the control unit 4 and the display unit 2 that are shown in FIG. 1B, respectively. On the other hand, the receiving user determination unit 24 is not an essential element of the present invention, and can be omitted.

FIGS. 4A to 4C each are a diagram showing an overview of data components of a user information DB (database).

Though not shown in FIG. 3, the user interface device 10 may include the user information DB which stores, for instance, basic attribute information and physical characteristics information.

As shown in FIG. 4B, the basic attribute information includes, for example, a name, an age, a gender, and a relationship. The basic attribute information may be referred to, for instance, at a time when the user identification unit 21 identifies a user in front of the image display unit 31.

As shown in FIG. 4C, the physical characteristics information stored in the user information DB includes, for example, body shapes according to user's postures, visual abilities, and auditory abilities, such as a body height and an eye height in a standing position, a body height and an eye height in a sitting position, a dominant hand, a dominant eye, eye sight, and audibility. The physical characteristics information may be referred to as reference information, for instance, at a time when the receiving user determination unit 24 determines a recipient-candidate user.

The user-detecting camera 11 is an image sensor such as a CCD (charge coupled device) and a CMOS (complementary metal oxide semiconductor) that are installed around the image display unit 31. The user-detecting camera 11 captures an image of the user in front of the image display unit 31.

2.1 User Identification Unit

The user identification unit 21 extracts a face region from the image captured by the user-detecting camera 11, and then outputs user identification information for identifying a user, by checking the extracted face image against pre-registered face images.

2.2 User Position Detection Unit

The user position detection unit 22 extracts user regions from images captured by the user-detecting camera 11, and then calculates a relative position between a user and the image display unit 31 based on a correspondence relationship between the user regions in the images, according to a principle of stereoscopy.

Figure 5A:
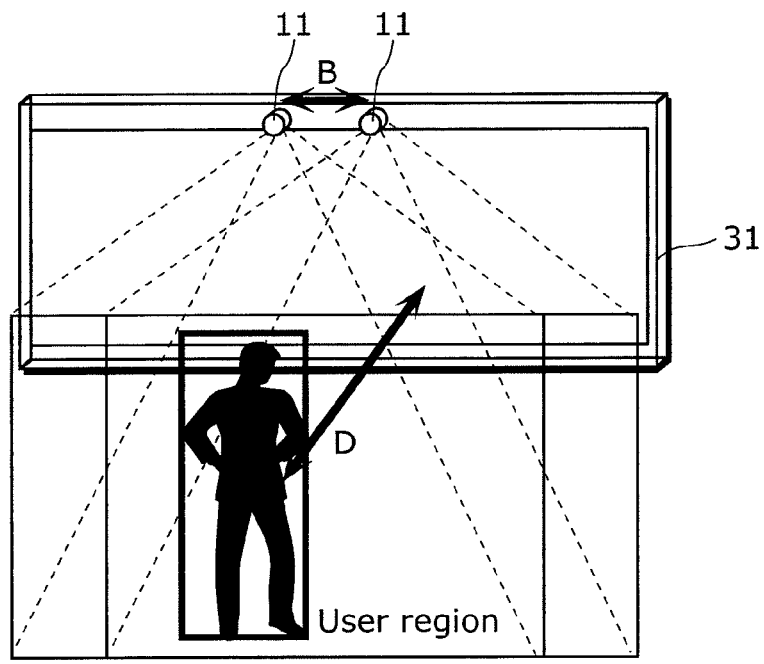
[FIG. 5A]
Figure 5B:
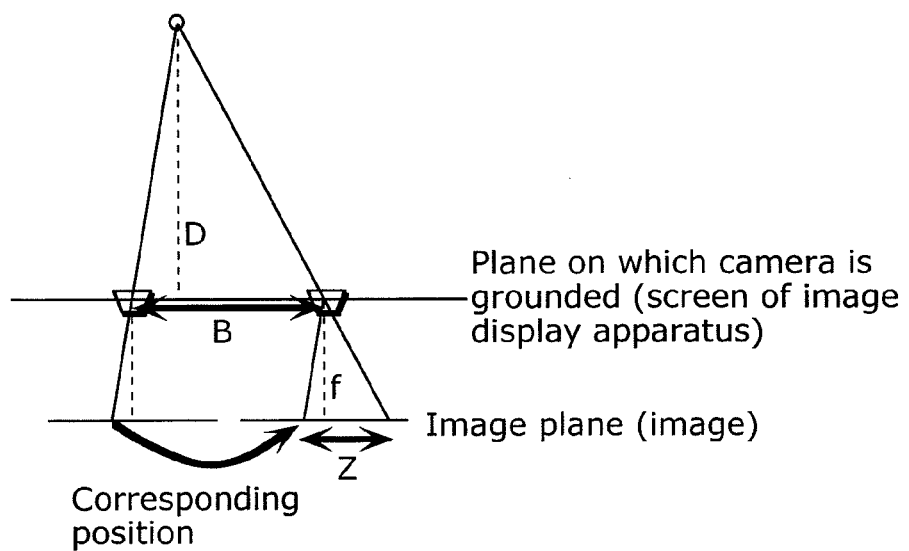
[FIG. 5B]

FIGS. 5A and 5B each are a diagram showing a user position calculation method based on a principle of stereoscopy in the user position detection unit 22 according to the one embodiment of the present invention.

As shown in FIG. 5A, a pair of two user-detecting cameras 11 is installed at an interval B in parallel to a screen of the image display unit 31. The user position detection unit 22 calculates a distance D between a user and the image display unit 31 based on position gaps between corresponding user regions in images each captured by a corresponding one of the user-detecting cameras 11. Extraction of the user regions in the images each captured by the corresponding one of the user-detecting cameras 11 can be achieved by, for instance, storing in advance an image captured by each of the user-detecting cameras 11 when there is no user in front of the user-detecting cameras 11 and determining differences between the stored images and images captured when the user appears in front of the user-detecting cameras 11. In addition, a face region of the user is determined by detecting a face image of the user and checking the face image against pre-registered face images, and the determined face region can be used as a user region.

FIG. 5B shows a principle of stereoscopy for determining a distance D between a user and a plane on which the user-detecting camera 11 is installed (the screen of the image display unit 31), based on corresponding user regions in two images. When the corresponding user region in each of the images captured by the two user-detecting cameras 11 is an object of which position is measured, the object is projected onto the two images as shown in FIG. 5B. When a gap between the corresponding objects in the images is Z, the distance D between the user and the image display unit 31 can be determined by the equation, $D = f \times B / Z$, where f is a focal length of one of the user-detecting cameras 11 and B is a distance between optical axes of the user-detecting cameras 11. In addition, a user position in a direction parallel to the screen of the image display unit 31 can be determined based on a position of the user region in each of the images and the above distance D. The user position detection unit 22 outputs the thus obtained relative position of the user with respect to the image display unit 31.

It is to be noted that a distance image sensor which outputs distance information according to a principle of electro-optical distance measurement (time of flight) may be used as the user-detecting camera 11. Including the distance image sensor in the user interface device 10 makes it easier for the user position detection unit 22 to calculate the relative position of the user with respect to the image display unit 31.

Furthermore, in the case where the floor pressure sensor is installed in a space as shown in FIG. 2C, the user position detection unit 22 can calculate, using an output value of the floor pressure sensor as an input, the relative position of the user with respect to the image display unit 31, without using the information provided by the user-detecting camera 11.

2.3 User Movement Detection Unit

After a hand region of the user is extracted, the user movement detection unit 23 checks whether a hand position and a hand shape match which pre-defined shape, and then outputs hand-shape information such as "clenched", "opened", "selecting right", and "selecting left".

Figure 6A:
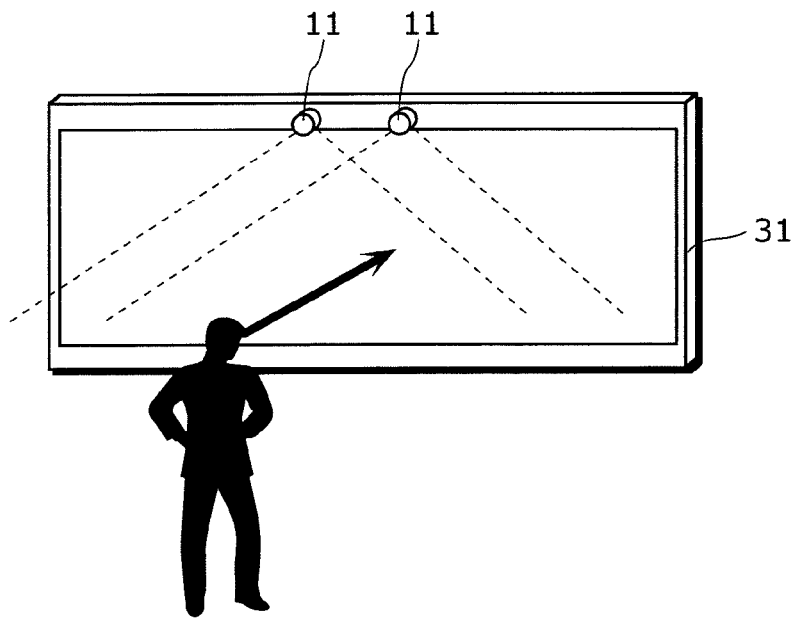
[FIG. 6A]
Figure 6B:
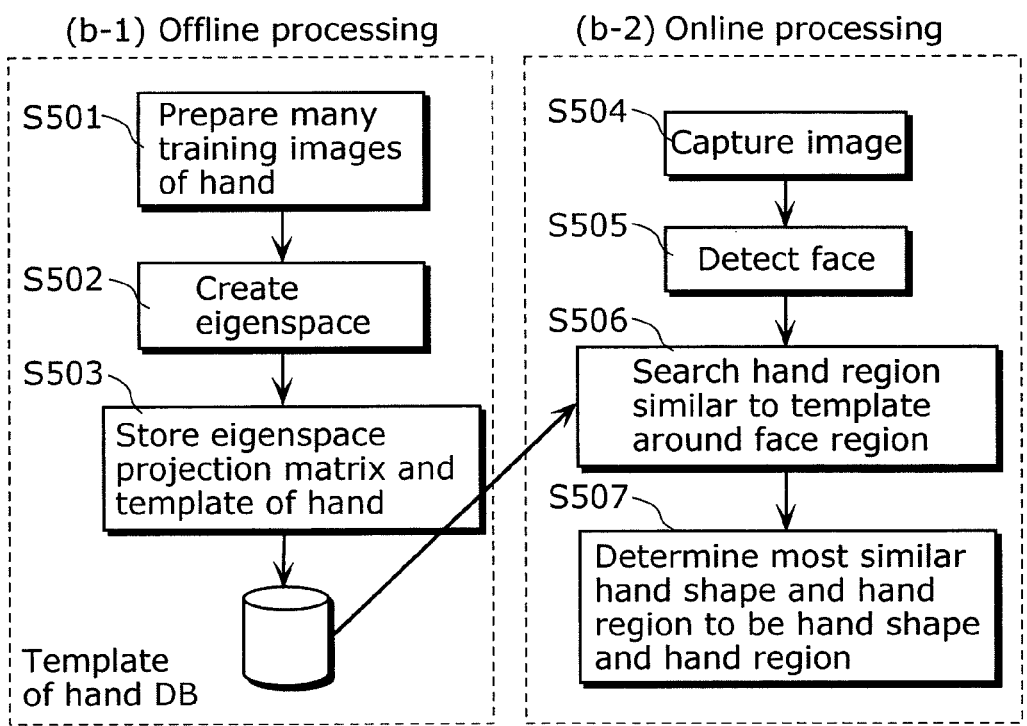
[FIG. 6B]

FIGS. 6A and 6B each show a method of detecting a hand position and a hand shape which is performed by the user movement detection unit 23 according to the one embodiment of the present invention.

As shown in FIG. 6A, the user movement detection unit 23 first detects a person's position based on an image captured by the user-detecting camera 11, and then detects a hand position and a hand shape around the person's position. As a method of estimating a hand position and a hand shape, for instance, the estimation is made possible by using the following method. The following describes such a method with reference to FIG. 6B.

First, as offline processing, the user movement detection unit 23 prepares a lot of training images of a hand to be detected (S501). It is desirable that conditions such as a lighting environment and orientation for the training images are consistent with conditions preferably in conformance to an environment where actual detection is performed. Next, the user movement detection unit 23 generates an eigenspace constituting a principal component of the hand from the training images prepared in S501, using a principal component analysis (S502). In addition, the user movement detection unit 23 prepares a template image of a hand as a sample of the hand to be detected. The template image may be a prepared average image of a hand or several images of a hand such as clenched and opened may be prepared. The user movement detection unit 23 stores, into a hand template database, a projection matrix onto the generated eigenspace and the template image of the hand (S503).

Next, the following describes online processing in which the actual detection is performed.

First, the user-detecting camera 11 captures an image of a user in front of the image display unit 31 (S504). The user movement detection unit 23 detects a face region from the image captured by the user-detecting camera 11 (S505).

When the face region is detected in S505, the user movement detection unit 23 detects a hand of the user around the face region. The user movement detection unit 23 searches a region around the face region for a region similar to the prepared template of the hand, using the template of the hand stored in the hand template database (S506). The region around the face region may be determined within a predetermined size range with respect to a position of a face of the user or a search range for the determination may be reduced by searching the region around the face region for a region close to the face in a depth distance, according to the principle of stereoscopy in which the two user-detecting cameras 11 are used.

As a calculation of a degree of similarity for matching, here, a candidate region image of the hand and the template image of the hand are projected onto the eigenspace using the prepared projection matrix onto the eigenspace. Then, a method of comparing distances of the candidate region image and the template image in the eigenspace is performed. Comparing the distances in the space indicating the major component of the hand makes it possible to perform the detection with reduced influence of noise such as background. A region which satisfies a predetermined threshold value and is closest to the template of the hand in distance within the search range is determined as the position of the hand. Moreover, a shape of the hand template (for example, clenched and opened) having the shortest distance is determined as a detected hand shape (S507).

On the other hand, when there is no region which satisfies the threshold value within the search range, the detection is terminated as the hand is not put out.

Although a template matching method is used for detecting the hand position and the hand shape in the above example, other methods such as boosting may be used.

In an application of the user interface device 10 of the present invention, for example, choices and hand positions and hand shapes each corresponding to a corresponding one of the choices are previously associated with each other for the user. Accordingly, it is possible to determine that a corresponding choice is made according to a change of the hand position and the hand shape of the user detected by the user movement detection unit 23.

2.4 Receiving User Determination Unit

The receiving user determination unit 24 determines a user (recipient-candidate user) estimated to be a user candidate receiving an object, using, as input information, the user identification information outputted by the user identification unit 21, the user position detected by the user position detection unit 22, and the information about the hand position and the hand shape outputted by the user movement detection unit 23.

FIGS. 7A to 8B each are a diagram showing an example of a preferred use case of the user interface device 10 according to the one embodiment of the present invention. Here, as an example, an object transferred between users is picture data.

Figure 7A:
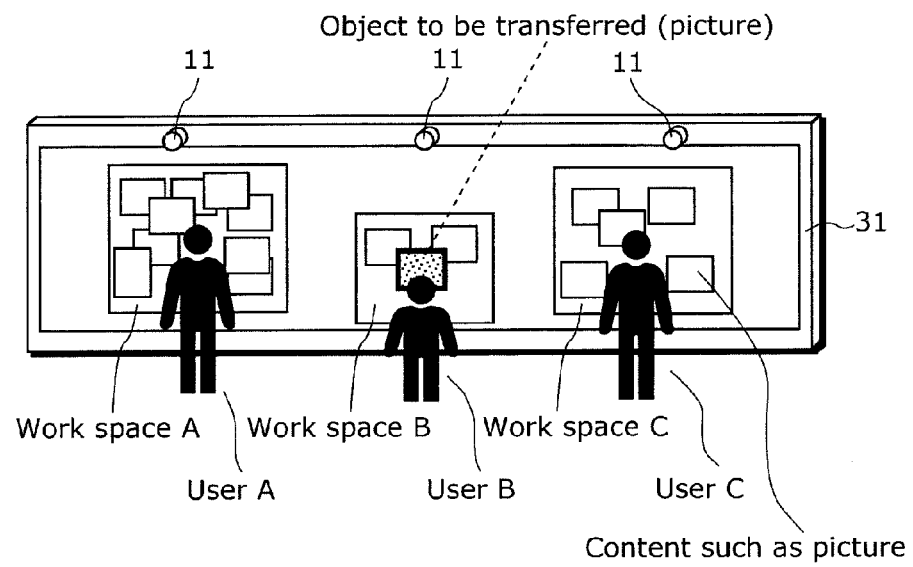
[FIG. 7A]

FIG. 7A shows a case where a user B transfers an object. In this case, when the user B moves a hand of the user B to the left with a picture to be transferred selected, the receiving user determination unit 24 determines that a user A positioned to the left of the user B is the recipient-candidate user. When the user B moves the hand to the right with the picture to be transferred selected, the receiving user determination unit 24 determines that a user C positioned to the right of the user B is the recipient-candidate user.

Figure 7B:
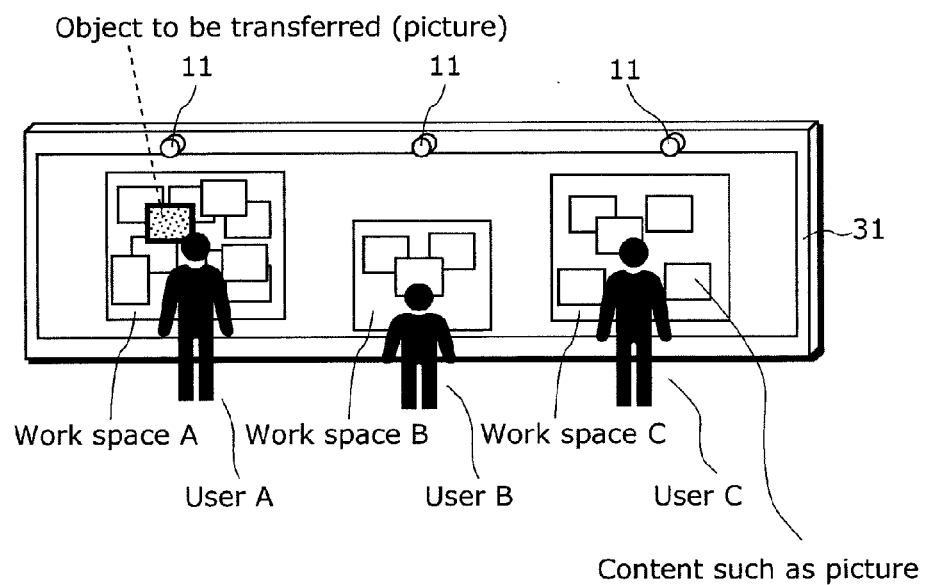
[FIG. 7B]

FIG. 7B shows a case where the user A transfers an object. In this case, when the user A moves a hand of the user A to the right with a picture to be transferred selected, the receiving user determination unit 24 can determine that the user A is attempting to transfer the picture to the user B or the user C and determines that the users B and C are the recipient-candidate users. Which of the users B and C receive the picture is determined by gestures of the users B and C.

Figure 8A:
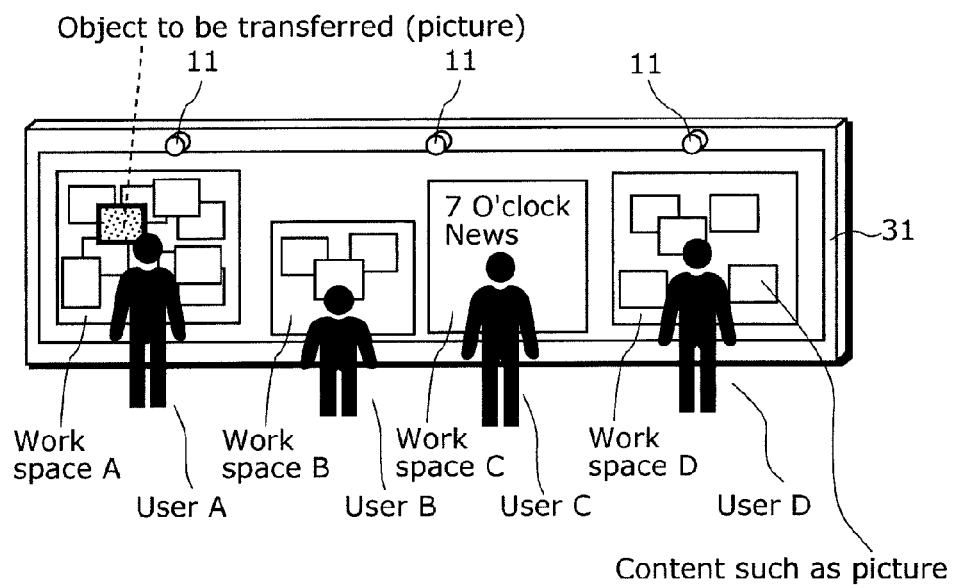
[FIG. 8A]

FIG. 8A shows a case where the user A transfers an object. A picture browsing application is executed in work spaces each corresponding to one of the users A, B, and D, and a broadcast content (news program) is displayed in a work space (work space C) on the screen corresponding to the user C.

In this case, when the user A moves the hand to the right with the picture to be transferred selected, the receiving user determination unit 24 determines that the users B and D among the users B, C, and D positioned to the right of the user A are the recipient-candidate users. On the other hand, the receiving user determination unit 24 determines that the user C is not the recipient-candidate user, because an application executed in the work space corresponding to the user C has little to do with the content to be transferred (picture).

Figure 8B:
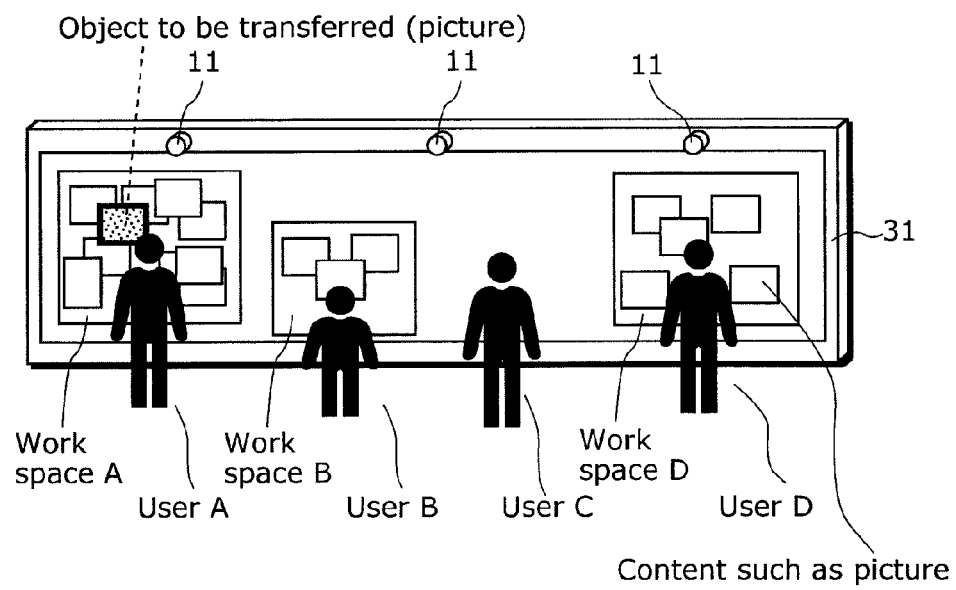
[FIG. 8B]

FIG. 8B shows a case where the user A transfers an object. In this case, the picture browsing application is executed in the work spaces each corresponding to the corresponding one of the users A, B, and D, and no application is executed in the work space corresponding to the user C even though the user C is in front of the image display unit 31. For instance, the user C is sleeping.

In this case, when the user A moves the hand to the right with the picture to be transferred selected, the receiving user determination unit 24 determines that the users B and D among the users B, C, and D positioned to the right of the user A are the recipient-candidate users. On the other hand, the receiving user determination unit 24 determines that the user C is not the recipient-candidate user, because no application is executed even though the user C is in front of the image display unit 31.

2.5 Object-To-Be-Transferred Display Control Unit

The object-to-be-transferred display control unit 25 controls the display of the object on the screen, using, as the input information, the user identification information outputted by the user identification unit 21, the user position detected by the user position detection unit 22, and the information about the hand position and the hand shape outputted by the user movement detection unit 23. The following section "3. Operation" describes a specific control method.

3. Operation

Figure 9:
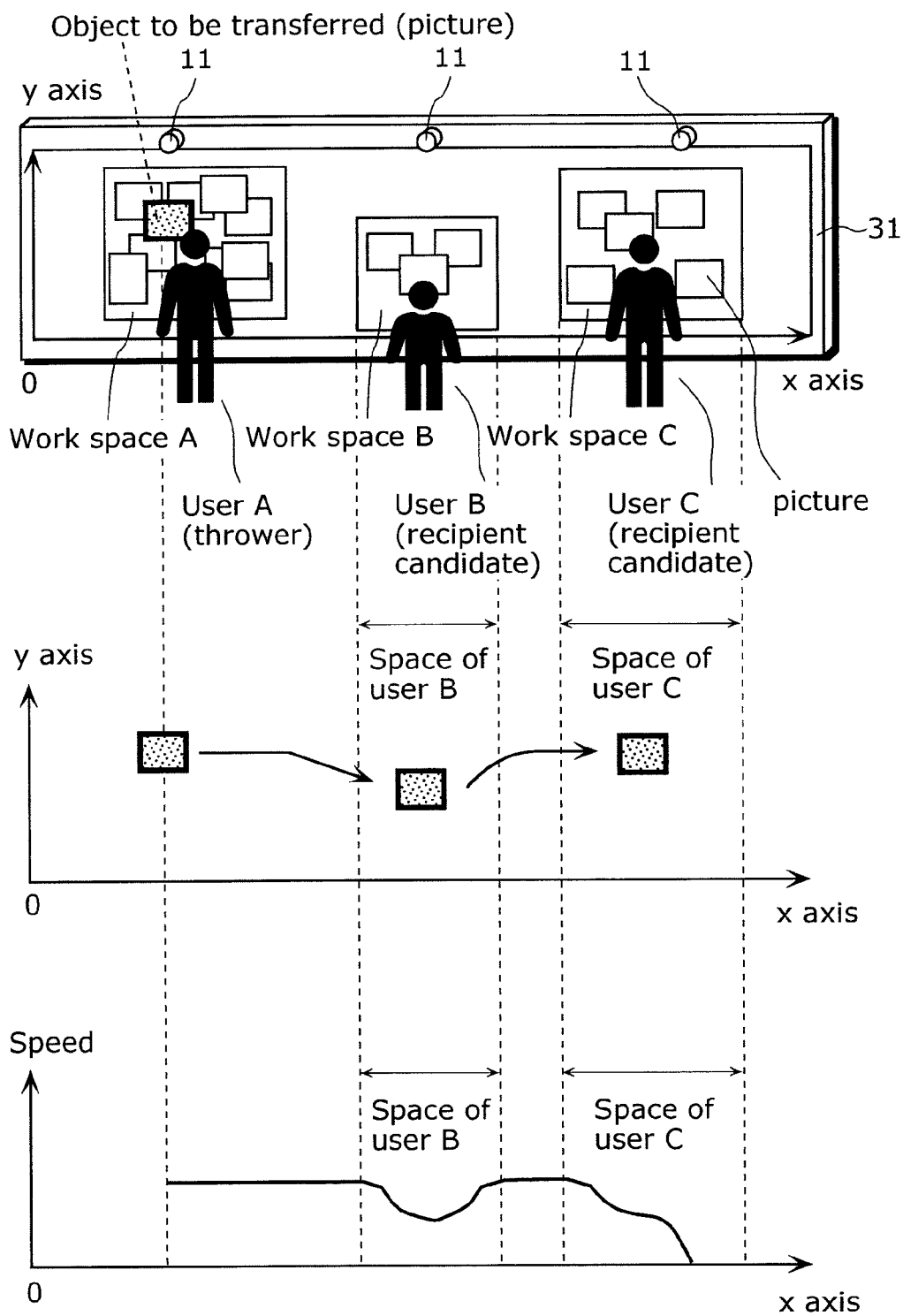
[FIG. 9]

FIG. 9 is a diagram showing an operation example of the user interface device 10 according to the one embodiment of the present invention.

A processing flow of the user interface device 10 is described using, as an example, a situation where three users (users A to C) are in front of the image display unit 31, and each of the three users uses the picture browsing application and transfers a picture with each other on the screen, as shown by the upper row in FIG. 9. In other words, the situation is a situation where a content is transferred on the screen as if playing catch. The three users are members of a family, the user A is a father, the user B is a daughter, and the user C is a mother. The processing flow is described especially using, as an example, a situation where the user A (father) is attempting to transfer a picture to the users B (daughter) and C (mother).

Figure 10:
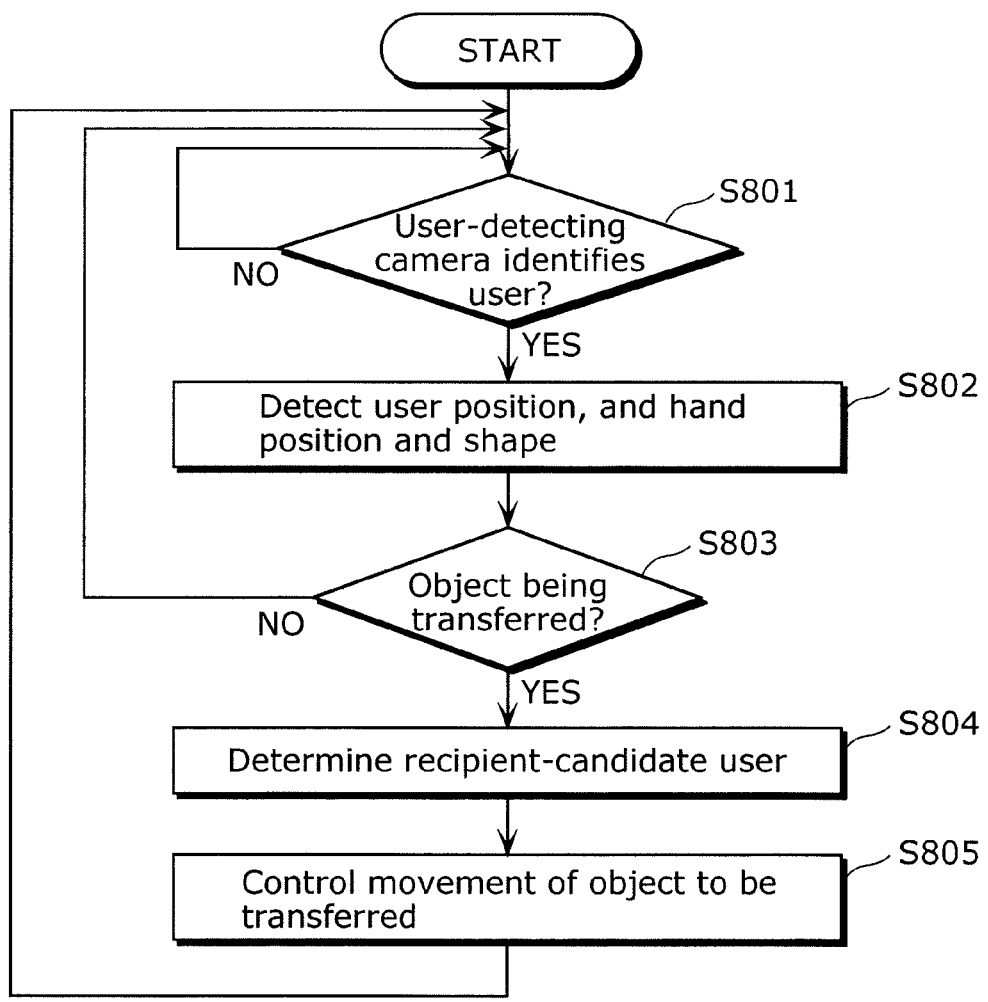
[FIG. 10]

FIG. 10 is a flowchart showing an overview of processing performed by the user interface device 10 according to the one embodiment of the present invention.

First, the user identification unit 21 performs user identification by checking faces of the users A to C detected by the user-detecting camera 11 against pre-registered physical characteristics information stored in a user information DB (S801). Then, the user position detection unit 22 and the user movement detection unit 23 calculate, for each of the identified users A to C, user position information and information about a hand position and a hand shape, respectively (S802).

When one of the users A to C makes a gesture of transferring an object on the screen (Yes in S803), the receiving user determination unit 24 determines a recipient-candidate user (S804). The object-to-be-transferred display control unit 25 controls a movement of the object to be transferred according to a position of the recipient-candidate user (S805).

In the case shown in FIG. 9, when the user A makes a gesture of transferring an object to the right on the screen, the users B and C are determined as recipient-candidate users. The determination results from considering a situation where the users A to C use the same type of application.

Figure 11:
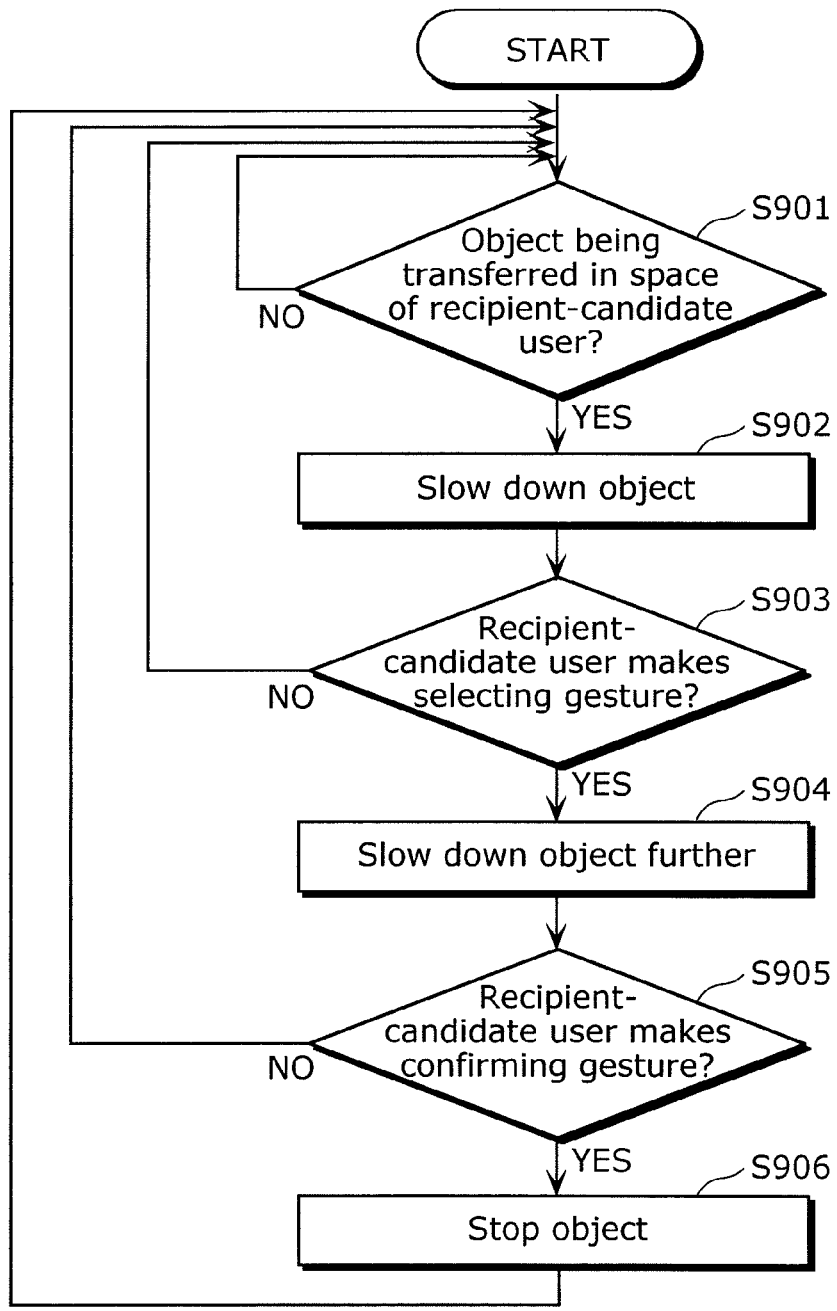
[FIG. 11]

The control of the movement of the object to be transferred is described according to the flowchart shown in FIG. 11.

When a moving object is in a space of the recipient-candidate user (Yes in S901), the object-to-be-transferred display control unit 25 slows down the object (S902). As shown by the upper row in FIG. 9, the space of the recipient-candidate user may be defined based on a width of a work space of each of the users A to C in the x axis direction or may be a space defined by portions having a predetermined size each on a corresponding one of the right and left sides of a position on the screen corresponding to a front of a standing position of the user.

When the recipient-candidate user makes a gesture indicating selection for reception (Yes in S903), the object-to-be-transferred display control unit 25 further slows down the object (S904). Further, when the recipient-candidate user makes a gesture indicating confirmation of reception (Yes in S905), the object-to-be-transferred display control unit 25 stops the object (S906). Coordinating the object with a hand movement before stopping the object allows a receiving user to stop the object at a desired position.

The gesture indicating selection for reception may be an operation of turning a palm to a screen for a predetermined time period. The gesture indicating confirmation of reception may be an operation of moving a fingertip of a thumb and fingertips of other fingers in a pinching manner or an operation in which a hand facing the screen is turned toward one's own face or chest. These operations correspond to an operation of grabbing an object, and become an intuitive operation such as holding and catching a picture on the screen.

Thus, as shown by the upper row in FIG. 9, the case where the user A is attempting to transfer the picture to the user on the right side of the user A is assumed as one example of the following operation flow of the user A.

(1) User A: Selecting a Picture to be Transferred

The user A turns the user A's palm to the screen to select a picture to be transferred. Moving the hand from side to side or up and down changes focus display of each of pictures in tandem with the movement, and thus the user A can select a desired picture. The selection may be confirmed by the user's above grabbing operation.

(2) User A: Making a Gesture of Transferring

When the user A moves the hand to the right for more than a predetermined distance with the picture selected, the user movement detection unit 23 interprets the user A's operation and generates a command for transferring (throwing) the picture to the right. Then, the picture starts moving to the right. Accordingly, the picture becomes an "independent object". A gesture corresponding to the command for transferring (throwing) may be an operation of moving a hand of a user for more than a predetermined distance in a direction that the user wants a picture to move.

(3) User B: Not Receiving

As shown by the bottom row in FIG. 9, when the independent object enters a space of the user B, the user B can check the picture without haste, because the picture is slowed down. Presentation on which the user B finds it easier to look at the picture and to operate can be achieved by controlling, as shown by the middle row in FIG. 9, a trajectory of the independent object so that the independent object passes at a height of the user B's eyes or shoulder, in consideration of the user B's body height. A user's body height can be obtained from a user information DB or be approximately calculated based on an image analysis of an image captured by the user-detecting camera 11.

The user B checks the picture, but thinks of not receiving the picture because the user B is not interested in the picture very much. Thus, the user B does not make a gesture indicating intention to receive. In that case, as shown by the bottom row in FIG. 9, slowing down of the independent object is terminated.

(4) User C: Selecting for Reception

As shown by the middle row in FIG. 9, when the independent object enters a space of the user C, the user C can check the picture without haste, because the picture is slowed down again. The user C makes the gesture indicating selection for reception, that is, an operation of turning the user C's palm to the screen, because the user C is interested in the picture when the user C checks the picture. In that case, the independent object is further slowed down.

(5) User C: Confirming Reception, Designating Stop Position

When a predetermined time period elapses with the user C's palm facing the screen in (4), a position of the picture moves in tandem with a movement of the user C's hand. Then, when the movement of the hand is kept within a predetermined range for the predetermined time period, the picture is stopped at the position.

With the above configuration, the recipient-candidate user of the object is estimated and the movement of the object is controlled based on the position of the recipient-candidate user, and thus the user to be a receiver can easily obtain the object.

It is to be noted that although the gestures are assumed the free hand gestures and the user's hand position and hand shape are detected using the image analysis of the image captured by the user-detecting camera in the present embodiment, one or all of the users may make a gesture on the touch table including the electrostatic touchpad shown in FIG. 1A, and the present invention is certainly effective in such a use case. When a recipient-candidate user puts the user's hand closer to the touch table, an object to be transferred may be selected for reception, and further when the user puts the hand on the touch table, the reception of the object is confirmed.

Furthermore, although the example of the content to be transferred between multiple people includes the picture in the present embodiment, contents to be transferred in a preferred manner made possible by applying the present invention are not certainly limited to pictures. Various kinds of contents displayed by the image display unit 31 are a scope of the application of the present invention.

Moreover, although the users are in the standing position in FIGS. 5A to 9, the present invention is not limited to the situation of the standing position. Needless to say, the present invention is effective to a case where a user is in a posture such as a sitting position.

4. Modifications

The following describes modifications.

4.1 Controlling Movement of Object

The object-to-be-transferred display control unit 25 may control a movement of an object to be transferred, in consideration of the following points.

(Consideration of Recipient-Candidate User's Physical Characteristic)

The movement of the object may be controlled based on a recipient-candidate user's physical characteristic. Examples of the user's physical characteristic include an age, a dominant arm, and a body height of the user. Data of these can be obtained from a user information DB. In addition, the body height of the user can be calculated by analyzing an image captured by the user-detecting camera.

When the age of the user is within a predetermined range, a degree of slowing down the object may be greater than a predetermined degree of slowing down. For instance, it is possible to enhance usability by making the degree of slowing down greater than the predetermined degree of slowing down for old people and children.

Moreover, when the dominant arm of the user is considered and the object is moving to the right on the screen, the degree of slowing down may be greater than the predetermined degree of slowing down in the case where the recipient-candidate user is left-handed, in comparison to a case where the recipient-candidate user is right-handed. When the object is moving to the left on the screen, the degree of slowing down may be greater than the predetermined degree of slowing down in the case where the recipient-candidate user is right-handed, in comparison to a case where the recipient-candidate user is left-handed. In addition, it is possible to produce the same effect by setting a start position for slowing down at a position farther from the user.

Furthermore, because a body height and a arm length basically have a positive correlation, making the degree of slowing down greater than the predetermined degree of slowing down when the body height is less than a predetermined value substantially corresponds to performing control in consideration of the arm length. As described in the above section "3. Operation", the usability can be enhanced by considering the user's body height and controlling the trajectory of the object so that the object passes at the height of the user's eyes or shoulder.

(Consideration of Recipient-Candidate User's Attribute)

The movement of the object may be controlled based on a recipient-candidate user's attribute.

For example, the trajectory and moving speed of the object may be controlled in view of metadata assigned to the object and a user's attribute. Here, examples of the user's attribute include information about a name, a gender, an age, interests, preferences and the like of the user which is recorded in a tag attached to an apparatus owned by the user.

For instance, a degree of interest with respect to an object to be transferred is estimated based on information about user's interests and preferences. In the case where the degree of interest is estimated high, the degree of slowing down the object at a position near the user may be greater than the predetermined degree of slowing down.

4.2 Operation at Edge of Screen

When an object to be transferred reaches near an edge of the screen, the movement of the object may be controlled by the following method.

(Bounced Off)

When a moving object to be transferred reaches the edge of the screen, the object may be bounded off using bouncing coefficient 1. The bouncing coefficient is not certainly limited to 1. Further, the number of times the object is bounced off at the edge of the screen is counted, and the bouncing coefficient may be changed depending on the number of times the object is bounced off.

(Stopped)

Moreover, when the moving object to be transferred reaches within a predetermined range from the edge of the screen, the movement of the object may be stopped.

(Hidden after Elapse of Predetermined Time Period)

Further, when the moving object to be transferred reaches within the predetermined range from the edge of the screen and a predetermined time period elapses with the movement of the object stopped, the object may be hidden.

With the above operations, the object is bounced off even when the recipient-candidate user fails to make the gesture indicating intention to receive once, and thus the recipient-candidate user can make the gesture indicating intention to receive when the object is bounced off. In addition, hiding the object after the elapse of the predetermined time period makes it possible to avoid a situation where a content undesired by the recipient-candidate user becomes distraction by being continuously displayed on the screen.

It is to be noted that although the above embodiment has described the example where the work space dedicated to the user is displayed in front of the user, the present invention is not limited to this, and a common work space that is shareable among multiple users may be provided. For instance, the common work space may be displayed at a halfway point between two users, and an object obtained by one of the users may be stopped in the common work space. In this case, the user may make the obtainment gesture, facing the common work space (that is, facing obliquely).

In addition, the above embodiment has described the example where the user obtains the object by making the obtainment gesture, the present invention is not limited to this, and the user interface device 10 may identify a user who is supposed to obtain an independent object, and stop the independent object in a work space assigned to the user.

For example, in the case where an independent object includes a content for children and there is only one child among multiple users, the user interface device 10 may allow the child user to obtain the independent object without waiting for the child user's obtainment gesture. Alternatively, in the case where there is only one user identified as the recipient-candidate user by the receiving user determination unit 24, the user interface device 10 may allow the user to obtain the independent object without waiting for the user's obtainment gesture.

Moreover, although the above embodiment has described the example where the user obtains the one object released by the other user, the present invention is not limited to this, and multiple objects can be simultaneously released. Here, the object-to-be-transferred display control unit 25 may control display so that the multiple objects do not overlap with each other.

Further, although the above embodiment has described the example where the user obtains the object released by the other user, the present invention is not limited to this, and the user interface device 10 may allow the user to obtain an object released by the user interface device 10.

<Further Note>

Although the user interface device of the present invention has been thus described based on the above embodiment, the present invention can be modified in the following manner and is not certainly limited to the user interface device according to the embodiment of the present invention.

(1) Each of the above devices may be specifically a computer system including a micro processing unit, a ROM, a RAM, a hard disk unit, a display unit, a keyboard, a mouse, and the like. A computer program is stored in the RAM or the hard disk unit. The micro processing unit operates according to the computer program, so that each of the devices fulfills a function. Here, in order to fulfill predetermined functions, the computer program is programmed by combining plural instruction codes each of which indicates an instruction for a computer. It is to be noted that each of the devices is not limited to the computer system including the micro processing unit, the ROM, the RAM, the hard disk unit, the display unit, the keyboard, the mouse, and the like, and may be a computer system including some of the components.

(2) Part or all of the components included in each of the above devices may be included in one system large scale integration (LSI). The system LSI is a super-multifunctional LSI manufactured by integrating components on one chip and is, specifically, a computer system including a micro processing unit, a ROM, a RAM, and the like. The computer program is stored in the RAM. The micro processing unit operates according to the computer program, so that the system LSI fulfills its function.

It is to be noted that although the system LSI is mentioned here, an IC, an LSI, a super LSI or an ultra LSI is used depending on a difference in a degree of integration. In addition, a method for realizing an integrated circuit is not limited to the LSI, and may be achieved by a dedicated circuit or a generic processor. After manufacturing the LSI, it is acceptable to use a Field Programmable Gate Array (FPGA) that is programmable or a reconfigurable processor in which connections and setting of circuit cells within the LSI are reconfiguration.

Further, if integrated circuit technology that replaces the LSI appears through progress in semiconductor technology or other derived technology, the technology may be surely used for integrating function blocks. There is a possibility of application of biotechnology or the like.

(3) Part or all of the components included in each of the above devices may be included in an IC card removable from each of the devices or in a stand alone module. The IC card or the module is a computer system including a micro processing unit, a ROM, a RAM, and the like. The IC card or the module may include the above super-multifunctional LSI. The micro processing unit operates according to the computer program, so that the IC card or the module fulfills its function. The IC card or the module may have tamper-resistance.

(4) The present invention may be any of the above methods. Furthermore, the present invention may be a computer program which causes a computer to execute these methods, and a digital signal which is composed of the computer program.

Moreover, in the present invention, the computer program or the digital signal may be recorded on a computer-readable recording medium such as a flexible disk, a hard disk, a CD-ROM, an MO, a DVD, a DVD-ROM, a DVD-RAM, a Blu-ray Disc, and a semiconductor memory. In addition, the computer program or the digital signal may be recorded on these recording media.

Furthermore, in the present invention, the computer program or the digital signal may be transmitted via an electronic communication line, a wireless or wired communication line, a network represented by the Internet, data broadcasting, and the like.

Moreover, the present invention may be a computer system including a micro processing unit and a memory. The memory may store the above computer program, and the micro processing unit may operate according to the computer program.

Furthermore, the present invention may execute the computer program or the digital signal in another independent computer system by recording the computer program or the digital signal on the recording medium and transmitting the recorded computer program or the digital signal or by transmitting the computer program or the digital signal via the network and the like.

(5) The above embodiments and the above modifications may be combined respectively.

[Industrial Applicability]

The user interface device according to the present invention is a large screen display operated by multiple people, and is useful to be applied to, for example, a large screen TV and outdoor electronic advertisement (digital signage).

[Reference Signs List]

1, 10 User interface device
2 Display unit
3 Detection unit
4 Control unit
11 User-detection camera
21 User identification unit
22 User position detection unit
23 User movement detection unit
24 Receiving user determination unit
25 Object-to-be-transferred display control unit
31 Image display unit

The invention claimed is:

1. A user interface device which allows a user to operate an object displayed in a work space assigned to the user, said user interface device comprising:
   a detection unit configured to detect a position of the user;
   a display unit configured to display the work space; and
   a control unit configured to control display of an independent object which belongs to no user,
   wherein said control unit is configured to:
   move the independent object in a mode which varies between when the independent object is in a face-to-face space of said display unit which is face to face with the position of the user detected by said detection unit and when the independent object is outside the face-to-face space; and stop the moving independent object in the work space assigned to the user when the user obtains the independent object, and
   wherein said control unit is further configured to cause a moving speed of the independent object moving in the face-to-face space to be slower than a moving speed of the independent object moving outside the face-to-face space.

2. The user interface device according to claim 1,
   wherein said detection unit is further configured to detect a gesture of the user,
   wherein said control unit is further configured to stop the independent object in the work space assigned to the user when said detection unit detects an obtainment gesture indicating that the independent object is to be obtained, and
   wherein the obtainment gesture is a gesture in which an open hand facing said display unit is clenched while a palm is being turned toward oneself.

3. The user interface device according to claim 1, wherein the object is a picture.

4. A user interface device which allows a user to operate an object displayed in a work space assigned to the user, said user interface device comprising:
- a detection unit configured to detect a position of the user;
- a display unit configured to display the work space; and
- a control unit configured to control display of an independent object which belongs to no user,
- wherein said control unit is configured to:
- move the independent object in a mode which varies between when the independent object is in a face-to-face space of said display unit which is face to face with the position of the user detected by said detection unit and when the independent object is outside the face-to-face space; and stop the moving independent object in the work space assigned to the user when the user obtains the independent object, and
- wherein said control unit is further configured to cause a display size of the independent object moving in the face-to-face space to be larger than a display size of the independent object moving outside the face-to-face space.

5. A user interface device which allows a user to operate an object displayed in a work space assigned to the user, said user interface device comprising:
- a detection unit configured to detect a position of the user;
- a display unit configured to display the work space; and
- a control unit configured to control display of an independent object which belongs to no user,
- wherein said control unit is configured to:
- move the independent object in a mode which varies between when the independent object is in a face-to-face space of said display unit which is face to face with the position of the user detected by said detection unit and when the independent object is outside the face-to-face space; and stop the moving independent object in the work space assigned to the user when the user obtains the independent object,
- wherein said detection unit is further configured to detect a gesture of the user,
- wherein said control unit is further configured to stop the independent object in the work space assigned to the user when said detection unit detects an obtainment gesture indicating that the independent object is to be obtained, and
- wherein the obtainment gesture is a gesture of turning a palm to a screen for a predetermined time period.

6. The user interface device according to claim 1,
- wherein said detection unit is further configured to detect a gesture of the user,
- wherein said control unit is further configured to stop the independent object in the work space assigned to the user when said detection unit detects an obtainment gesture indicating that the independent object is to be obtained, and
- wherein the obtainment gesture is a gesture of moving a fingertip of a thumb and fingertips of other fingers in a pinching manner.

7. A user interface device which allows a user to operate an object displayed in a work space assigned to the user, said user interface device comprising:
- a detection unit configured to detect a position of the user;
- a display unit configured to display the work space; and
- a control unit configured to control display of an independent object which belongs to no user,
- wherein said control unit is configured to:
- move the independent object in a mode which varies between when the independent object is in a face-to-face space of said display unit which is face to face with the position of the user detected by said detection unit and when the independent object is outside the face-to-face space; and stop the moving independent object in the work space assigned to the user when the user obtains the independent object,
- wherein said detection unit is further configured to detect a gesture of the user,
- wherein said control unit is further configured to stop the independent object in the work space assigned to the user when said detection unit detects an obtainment gesture indicating that the independent object is to be obtained, and
- wherein, when said detection unit detects, with respect to an object possessed by an other user different from the user, a releasing gesture of the other user indicating that the object is to be released, said control unit is configured to control display of the object as the independent object.

8. The user interface device according to claim 7,
- wherein said control unit is further configured to approximate a display angle of the independent object moving in the face-to-face space to a display angle at a time when the other user makes the releasing gesture.

9. A user interface device which allows a user to operate an object displayed in a work space assigned to the user, said user interface device comprising:
- a detection unit configured to detect a position of the user;
- a display unit configured to display the work space; and
- a control unit configured to control display of an independent object which belongs to no user,
- wherein said control unit is configured to:
- move the independent object in a mode which varies between when the independent object is in a face-to-face space of said display unit which is face to face with the position of the user detected by said detection unit and when the independent object is outside the face-to-face space; and stop the moving independent object in the work space assigned to the user when the user obtains the independent object,
- wherein said display unit is divided into work spaces each assigned to a corresponding one of users,
- said user interface device further comprises a determination unit configured to determine, among the users, a recipient-candidate user which is a candidate to receive the independent object, and
- said control unit is further configured to:
- move the independent object in the mode which varies between when the independent object is in a face-to-face space of said display unit which is face to face with a position of the recipient-candidate user detected by said detection unit and when the independent object is outside the face-to-face space; and stop the independent object in a work space assigned to the recipient-candidate user when the recipient-candidate user obtains the independent object.

10. The user interface device according to claim 9,
- wherein said detection unit is further configured to detect a gesture of the user, and
- said control unit is further configured to increase a moving speed of the independent object when said detection unit detects an obtainment refusing gesture of the recipient-candidate user indicating that the independent object is not to be obtained, with the independent object being in the face-to-face space of the recipient-candidate user.

11. The user interface device according to claim 10, wherein the obtainment refusing gesture is a gesture of moving a hand from side to side.

12. The user interface device according to claim 10, wherein the obtainment refusing gesture is a state where the obtainment gesture has not been made.

13. A user interface device which allows a user to operate an object displayed in a work space assigned to the user, said user interface device comprising:
a detection unit configured to detect a position of the user;
a display unit configured to display the work space; and
a control unit configured to control display of an independent object which belongs to no user,
wherein said control unit is configured to:
move the independent object in a mode which varies between when the independent object is in a face-to-face space of said display unit which is face to face with the position of the user detected by said detection unit and when the independent object is outside the face-to-face space; and stop the moving independent object in the work space assigned to the user when the user obtains the independent object,
wherein said control unit is further configured to control the display of the independent object based on a physical characteristic of the user,
wherein the physical characteristic is an age of the user, and
said control unit is further configured to cause a moving speed of the independent object moving in the face-to-face space to be slower as the age of the user is lower.

14. A user interface device which allows a user to operate an object displayed in a work space assigned to the user, said user interface device comprising:
a detection unit configured to detect a position of the user;
a display unit configured to display the work space; and
a control unit configured to control display of an independent object which belongs to no user,
wherein said control unit is configured to:
move the independent object in a mode which varies between when the independent object is in a face-to-face space of said display unit which is face to face with the position of the user detected by said detection unit and when the independent object is outside the face-to-face space; and stop the moving independent object in the work space assigned to the user when the user obtains the independent object,
wherein said control unit is further configured to control the display of the independent object based on a physical characteristic of the user,
wherein the physical characteristic is a dominant arm of the user, and
said control unit is further configured to change a moving speed of the independent object moving in the face-to-face space according to a combination of the dominant arm and a moving direction of the independent object on said display unit.

15. A user interface device which allows a user to operate an object displayed in a work space assigned to the user, said user interface device comprising:
a detection unit configured to detect a position of the user;
a display unit configured to display the work space; and
a control unit configured to control display of an independent object which belongs to no user,
wherein said control unit is configured to:
move the independent object in a mode which varies between when the independent object is in a face-to-face space of said display unit which is face to face with the position of the user detected by said detection unit and when the independent object is outside the face-to-face space; and stop the moving independent object in the work space assigned to the user when the user obtains the independent object,
wherein said control unit is further configured to control the display of the independent object based on a physical characteristic of the user,
wherein the physical characteristic is a body height of the user, and
said control unit is further configured to cause a moving speed of the independent object moving in the face-to-face space to be slower as the body height of the user is lower.

16. A user interface device which allows a user to operate an object displayed in a work space assigned to the user, said user interface device comprising:
a detection unit configured to detect a position of the user;
a display unit configured to display the work space; and
a control unit configured to control display of an independent object which belongs to no user,
wherein said control unit is configured to:
move the independent object in a mode which varies between when the independent object is in a face-to-face space of said display unit which is face to face with the position of the user detected by said detection unit and when the independent object is outside the face-to-face space; and stop the moving independent object in the work space assigned to the user when the user obtains the independent object,
wherein said control unit is further configured to control the display of the independent object based on a physical characteristic of the user,
wherein the physical characteristic is a body height of the user, and
said control unit is further configured to cause a display height of the independent object moving in the face-to-face space to be lower as the body height of the user is lower.

17. A user interface device which allows a user to operate an object displayed in a work space assigned to the user, said user interface device comprising:
a detection unit configured to detect a position of the user;
a display unit configured to display the work space; and
a control unit configured to control display of an independent object which belongs to no user,
wherein said control unit is configured to:
move the independent object in a mode which varies between when the independent object is in a face-to-face space of said display unit which is face to face with the position of the user detected by said detection unit and when the independent object is outside the face-to-face space; and stop the moving independent object in the work space assigned to the user when the user obtains the independent object, and
wherein said control unit is further configured to control the display of the independent object according to metadata attached to the independent object and attribute information of the user.

18. The user interface device according to claim 17, wherein said control unit is further configured to obtain the attribute information by communicating with a mobile terminal carried by the user.

19. A user interface device which allows a user to operate an object displayed in a work space assigned to the user, said user interface device comprising:

a detection unit configured to detect a position of the user;
a display unit configured to display the work space; and
a control unit configured to control display of an independent object which belongs to no user,
wherein said control unit is configured to:
move the independent object in a mode which varies between when the independent object is in a face-to-face space of said display unit which is face to face with the position of the user detected by said detection unit and when the independent object is outside the face-to-face space; and stop the moving independent object in the work space assigned to the user when the user obtains the independent object, and
wherein, when the independent object reaches one end of said display unit, said control unit is configured to move the independent object toward the other end of said display unit.

20. A user interface device which allows a user to operate an object displayed in a work space assigned to the user, said user interface device comprising:
a detection unit configured to detect a position of the user;
a display unit configured to display the work space; and
a control unit configured to control display of an independent object which belongs to no user,
wherein said control unit is configured to:
move the independent object in a mode which varies between when the independent object is in a face-to-face space of said display unit which is face to face with the position of the user detected by said detection unit and when the independent object is outside the face-to-face space; and stop the moving independent object in the work space assigned to the user when the user obtains the independent object, and
wherein, when the independent object reaches a position away from one end of said display unit by a predetermined distance, said control unit is configured to stop the independent object.

21. The user interface device according to claim 20,
wherein, when a predetermined time period elapses with the independent object stopped, said control unit is configured to hide the independent object.

22. A user interface method of allowing a user to operate an object displayed in a work space assigned to the user, using a display unit which displays the work space, said user interface method comprising:
detecting a position of the user; and
controlling display of an independent object which belongs to no user,
wherein, in said controlling, (i) the independent object is moved in a mode which varies between when the independent object is in a face-to-face space of the display unit which is face to face with the position of the user detected in said detecting and when the independent object is outside the face-to-face space, (ii) the independent object is stopped in the work space assigned to the user when the user obtains the independent object, and (iii) a moving speed of the independent object moving in the face-to-face space is caused to be slower than a moving speed of the independent object moving outside the face-to-face space.

23. A non-transitory computer-readable recording medium on which a program causing a computer to execute the user interface method according to claim 22 is recorded.

* * * * *